United States Patent Office 2,693,735
Patented Nov. 9, 1954

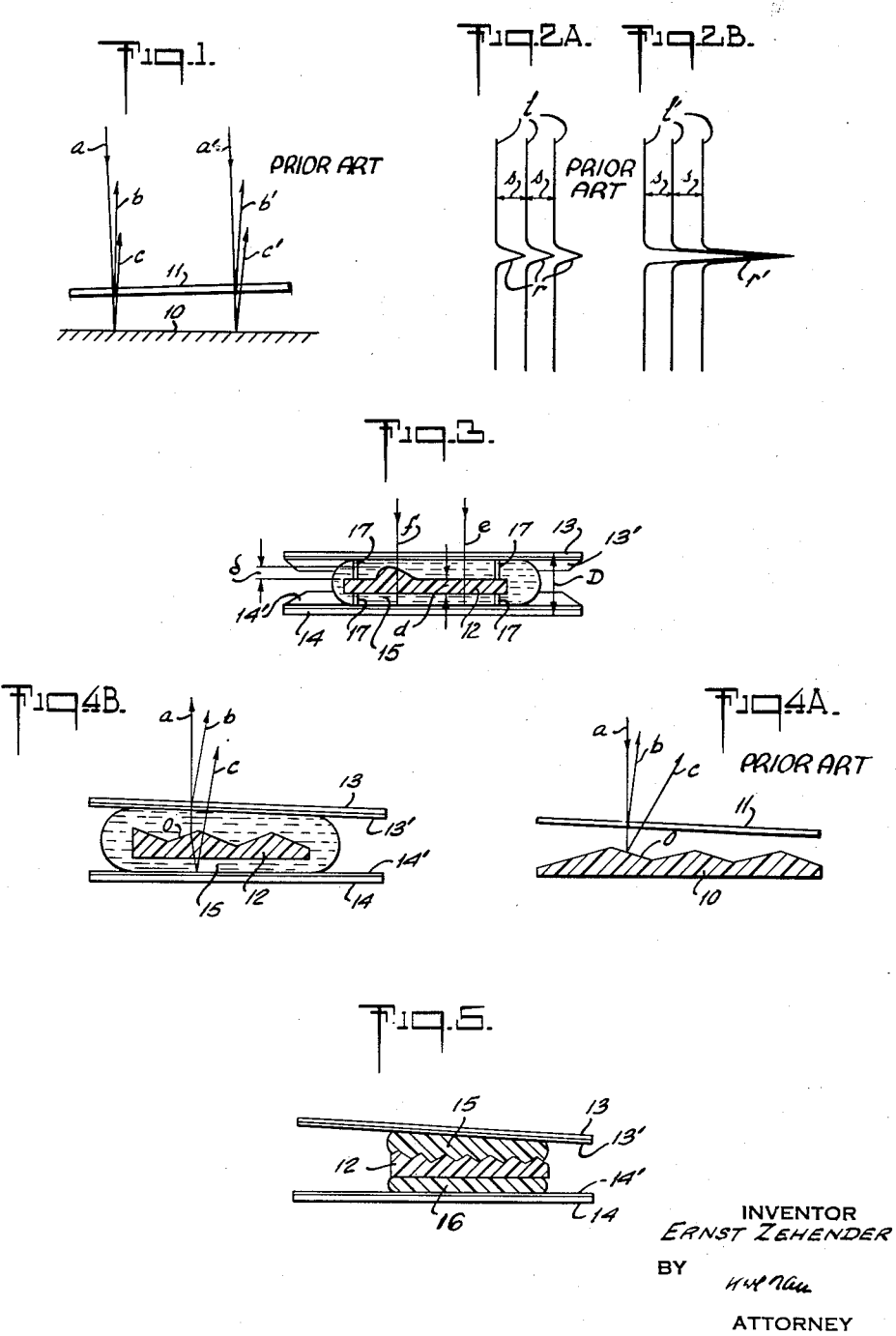

2,693,735

METHOD OF DETERMINING SURFACE ROUGHNESS

Ernst Zehender, Stuttgart-Vaihingen, Germany, assignor to Robert Bosch G. m. b. H., Stuttgart, Germany Application March 3, 1953, Serial No. 340,040

Claims priority, application Germany March 8, 1952

7 Claims. (Cl. 88—14)

The present invention relates to means for determining the surface roughness of objects, in particular of milled or finished work pieces by the aid of an interference microscope or measuring device.

It is known to investigate the minute surface roughness or asperities of objects by the aid of an optical interference method, wherein lines of equal distance upon the surface being investigated caused by interference of monochromatic light are rendered visible and/or photographically recorded by a so-called interference microscope.

All the previous methods have in common that they are limited practically to the determination of roughness or differences between the minute elevations and depressions of the surface being investigated which are less than about one micron, since the interference lines for roughnesses beyond this value will be so close to one another as to be no longer individually discernible. Furthermore, in the case of flutes or grooves traversing the surface and having a depth greater than about one micron, an exact determination of the depth and cross-section or profile of the grooves or depressions is no longer possible, since in such a case the deflections or deviations of the interference lines at the intersection with the grooves exceed the spacing distance between the lines and can no longer be differentiated from one another. A possible solution to overcome this difficulty consists in increasing the wavelength of the operating light source. This, however, aside from other shortcomings, would preclude the use of light within the visible region.

An object of the present invention is, therefore, to overcome the above and related difficulties and to render the interference method for determining surface roughness substantially independent of the degree or type of roughness being investigated, to thereby greatly extend its usefulness in practice.

With the above and further objects in view, as will appear more clearly hereafter, the invention according to one aspect involves generally the production of optical interference lines of "equal thickness" by passing at least one of the interfering light rays in an interferometer through a transparent imprint or matrix of the surface being investigated, said matrix having a surface being an exact replica of the surface to be investigated and being embedded in or arranged in intimate contact with a preferably fluid medium having a refractive index different from the refractive index of said matrix.

The invention will be better understood by reference to the following detailed description of a practical embodiment thereof, taken in conjunction with the accompanying drawing forming part of this specification and wherein:

Fig. 1 is a diagram explanatory of the previously known interference method for determining surface roughness;

Figs. 2A and 2B show the interference lines observed in the viewing field of an interference microscope operating according to a method illustrated by Fig. 1;

Fig. 3 is a diagrammatic representation of an improved interferometer construction embodying the principles of the invention;

Figs. 4A and 4B are partial diagrams illustrative of one aspect of the previous method and of the improvement according to the invention, respectively; and Fig. 5 shows a modification of the invention.

Like reference characters identify like parts in different views of the drawing.

Referring to Fig. 1 illustrating the previously known interference method for investigating surface roughness, the numeral 10 represents the surface being investigated above which is disposed at a suitable distance a substantially plane plate 11 consisting of glass or an equivalent transparent material and being coated in known manner with a partial or semi-transparent reflecting layer of silver or an equivalent material.

Incident rays $a$ and $a'$ of monochromatic light supplied by a suitable source are impinged upon the plate 11 substantially at right angle thereto and partially reflected to produce primary reflected rays $b$ and $b'$, respectively. The remainder of the rays $a$ and $a'$ after passing through the plate 11 are in turn reflected by the surface 10 assumed to be a perfectly smooth or plane surface, to produce secondary reflected rays $c$ and $c'$, respectively. As a result, the reflected rays $b$ and $b'$ being superimposed upon the reflected rays $c$ and $c'$, respectively, are caused to interfere with the latter, whereby to result in a complete cancellation whenever the optical path difference between the interfering rays will be equal to an odd number multiple of half the wavelength $\lambda/2$ of the operating light source. As a consequence, if the surface 10 and plate 11 are slightly inclined relatively to one another, the viewing field of a microscope focused upon the surface 10 will be traversed by a family of parallel interference lines spaced from each other by equal distances determined both by the angle of inclination between the surfaces and the wavelength of the light being used. In an interference pattern of this type, the thickness of the wedge-shaped space or medium between the surfaces 10 and 11 from one to the next interference line changes by a value of $\lambda/2$.

Assuming now that the surface 10 has a roughness such as in the form of a minute groove or flute within the plane of the drawing (not shown), then the interference lines $l$ will be deflected or deviated locally at the points of intersection with said groove as shown at $r$ in Fig. 2A. In the latter, the extent of the deviations is shown to be exactly equal to a single line distance $s$, wherefrom it follows that in this case the depth of the groove is equal to $\lambda/2$. From the shape of the deviations it is furthermore possible to determine details as to the cross-section or profile of the groove.

If the groove has a greater depth, and especially if the depth is in excess of the wavelength $\lambda$ of the light source, especially if the extent of the deviations $r$ exceeds approximately twice the line distance $s$, then the interference pattern obtained by the known method will no longer be clearly defined as shown by Fig. 2, wherein the deviations $r'$ of the lines 1, encroach upon or merge into one another so as to be no longer individually discernible. Thus, among other defects it would not be possible in such a case to detect the difference between the heights of the opposite banks of a groove or depression being zero or a whole number multiple of $\lambda/2$.

According to the present invention the "depth resolution" of the interference pattern is adapted to or increased for use with varying degrees of roughness by the provision of an improved method and interferometer construction shown diagrammatically by Fig. 3. More specifically, according to the invention the differences between the optical paths of the interfering light rays one of which passes through an imprint or matrix of transparent material of the surface being investigated, are rendered visible by a set or pattern of interference lines of increased definition, to enable an exact determination and measurement of the type and degree of the roughness being investigated. For this purpose a transparent imprint or matrix 12, preferably in the form of a film of lacquer or a suitable plastic material, is made of the surface to be investigated, one side of said matrix being an exact replica of the surface being investigated and its opposite side having a perfectly smooth or plane surface. This imprint or matrix is embedded or arranged in intimate contact with a preferably fluid or semi-fluid medium 15 and mounted between a pair of relatively inclined semi-transparent reflecting plates 13 and 14 of an interferometer, the inclination of the plates in the example shown being in a direction at right angle to the plane of the drawing. The plates 13 and 14 may consist of glass and should be perfectly plane to produce a uniform and undistorted linear pattern in a manner similar to the plate 11 of Fig. 1. In this case, the interference lines are deflected or deviated due to the change of the optical path difference at the points where the imprint or matrix varies in thickness in accordance with original depressions and elevations on the surface being investigated.

The function and operation of the invention will be further understood by the following theoretical analysis:

Assuming D to be the distance between the plates 13 and 14 having partially reflecting surfaces 13' and 14', respectively, $d$ to be the thickness of one portion of the matrix or film 12 and $\delta$ to be the height of a hump or elevation corresponding to a depression or groove upon the original surface being investigated, and assuming further $n_E$ and $n_A$ to be the refractive indices of the embedding medium 15 and the matrix 12, respectively, the then effective optical paths $\Delta_a$ and $\Delta_b$ for the light rays $e$ and $f$ traversing the portions of different thickness of the matrix 12 are determined by the following formulae:

(1) $\quad \Delta_a = 2\{n_E(D-d) + n_A d\}$ and (2) $\quad \Delta_b = 2\{n_E(D-d-\delta) + n_A(d+\delta)\}$ Assuming that $\delta$ equals $\delta_0$ representing a difference in the thickness of the matrix corresponding to an optical path difference equal to $\lambda$ or in turn to a deviation of the interference lines by a full spacing distance, then $\Delta_a$ and $\Delta_b$ are related as follows:

(3) $\quad \Delta_b - \Delta_a = \lambda$

Combining Equations 1 and 2 with Equation 3 produces the following new equation:

(4) $\quad \lambda = 2\{n_E(D-d-\delta_0) + n_A(d+\delta_0) - n_E(D-d) - n_A d\}$ from which $\delta_0$ is derived as follows:

(5) $\quad \delta_0 = \lambda / 2(n_A - n_E)$

In comparison, according to the previous method illustrated by Fig. 1 and using air between the surfaces 10 and 11, $\delta_0$ is determined as follows:

$$\delta_0 = \lambda/2$$

Accordingly, by the use of the invention, the differences between the elevations and depressions upon the surface being investigated, or, in turn, of the thickness of the matrix film or imprint, causing a deviation of the interference lines to an extent equal to a single spacing distance $s$, is no longer dependent solely upon the wavelength $\lambda$ but also upon the difference of the refractive indices of both the matrix and the embedding medium. By a variation of the latter it is possible, therefore, to control the resolution of the interference pattern within wide limits in an effort to obtain an optimum resolution and to adapt it to a desired degree or range of roughness to be investigated.

As an example, if $n_A = 1.5$, $\delta_0$ will be 10 microns for olive oil as embedding medium, 7 microns for silicone oil, 3 microns for water and .6 micron for air, assuming an average wavelength within the visible region (0.4 to 0.8 microns). From this it is seen that $\delta_0$ can be varied by more than one order of magnitude.

According to a preferred method of carrying out the invention, the matrix or imprint of the sample surface to be investigated takes the form of a thin film of transparent lacquer or an equivalent material. In order to insure an accurate impression of the sample surface, one side of the film may be wetted by a suitable solvent and firmly pressed upon the sample surface. Alternatively, heat may be used to increase the plasticity with or without a solvent or wetting agent in an effort to obtain a true copy or replica of the configuration of the asperities or minute elevations and depressions to be investigated. This impression film or matrix is then mounted within the wedge-shaped space enclosed by the partially reflecting plates 13 and 14 of the interferometer. For practical purposes, the size and shape of the matrix film may be standardized and the device provided with suitable supporting or mounting means, such as brackets 17 or the like.

The embedding medium 15 is suitably chosen to have a desired refractive index to secure a well-defined interference pattern of adequate resolution for a given type of sample or degree of roughness, in the manner described hereinbefore. In its simplest form of embodiment, the embedding medium may be air having a refractive index equal to 1, while the matrix film may consist of a material having a refractive index of proper value to suit existing conditions and requirements. If a liquid or solid embedding material is used, the latter may advantageously contain a suitable wetting agent in order to insure an intimate contact with the impressed surface of the matrix and to prevent undesirable distortion of the interference lines or pattern.

A further advantage of the invention is the fact that in rendering a steep flank by the interference pattern, interference lines are produced of much greater definition than were obtainable with the previous method. This will be further understood by reference to Figures 4A and 4B, the former showing the condition according to the previous method, as illustrated by Fig. 1, and the latter illustrating the advantages obtained by the invention.

More specifically, in Fig. 4A the incident ray $a$ is reflected partly by the plate 11 and by the surface 10 shown with the depressions on an exaggerated scale for clearness of illustration. If $o$ is a relatively steep flank, the reflected rays $b$ and $c$ are unable to interfere with one another due to the relatively large angle of divergence between them. On the other hand, in the case of the invention, as shown in Fig. 4B, the incident ray $a$ being partially reflected by the plate 10 to produce a primary ray $b$, upon passing through the plate 13, is caused to traverse both the medium 15 and the matrix 12 to result in a final secondary reflected ray $c$ by the plate 14 in substantially the same direction as the reflected ray $b$, so as to readily interfere with the latter. The reason for the reduced divergence angle in the case of Fig. 4B as compared with Fig. 4A is the fact that the direction of the ray $c$ in the case of the invention is due primarily to refraction upon passing through the matrix 12, rather than to mere reflection by the flank $o$ in Fig. 4A.

The medium for embedding the matrix or imprint 12 is preferably a fluid although a solid or semi-solid material can be used for the same purpose. In the latter case, the material may be impressed directly, such as by means of a heating plate, upon the lacquer imprint which for this purpose has been previously sufficiently hardened. In the latter case, one of the plates 13 or 14 may be applied during the same process.

In Fig. 5 there is shown a modification of the invention, wherein the side of the matrix 12 opposite to its impressed surface need not be perfectly smooth and is embedded or arranged in intimate contact with a second medium 16 being either fluid, solid or semi-solid and having the same refractive index as the matrix 12, whereby to render any irregularities of the plane surface of the matrix 12 optically ineffective. The impressed side of the matrix 12 may have applied to it or be in contact with a medium 15 in the manner described hereinbefore, the whole assembly being mounted between a pair of inclined reflecting plates 13 and 14 in a manner understood from the foregoing.

According to a further feature of the invention, it is essential to insure a close optical contact between the embedding medium or media on the one hand and the deflecting plates and the imprint or matrix on the other hand, in order to avoid the inclusion of voids or air bubbles resulting in errors or undesirable distortion of the interference pattern. For this purpose it is advisable to admix a suitable wetting agent with the embedding medium or media.

An arrangement according to the invention as shown in Fig. 3 may be structurally combined with any existing interferometer microscope, such as of the type according to Linnik and described by A. Kohaut in Zeitschrift fuer angewandte Physik, vol. 1, 1948/49, 165–173.

For practical purposes, it is desirable to orient the interfering lines with regard to a preferred reference direction of the surface being investigated, such for instance as in relation to the grooves or flutes in an otherwise smooth work piece. If the interference lines form an angle different from a right angle with the grooves, the reproduction scale will be changed in addition to other drawbacks and disadvantages. In order to provide a suitable adjusting arrangement for this purpose, i. e. to enable the plates 13 and 14 to be inclined in any desired direction with respect to one another, the device may include a resiliently mounted support for one of the plates having a light transmitting opening for passing the operating light beam and being angularly adjustable in different directions by means of set screws relative to the support for the other plate, in a manner readily understood by those skilled in the art.

In the foregoing the invention has been described by reference to a specific illustrative device and method. It will be evident, however, that variations and modifications as well as the substitution of equivalent parts and steps for those described for illustration, may be made without departing from the broader scope and spirit of the invention as defined in the appended claims. The specification and drawing are accordingly to be regarded in an illustrative rather than in a limiting sense.

I claim:

1. A method of determining surface roughness comprising producing a transparent matrix of a surface to be investigated, impinging monochromatic light upon a wedge-shaped light transmitting medium bounded by plane reflecting surfaces and having a refractive index differing from the refractive index of said matrix, to produce a multiple-line interference pattern by light rays reflected by said surfaces, and interposing said matrix in the path of the light rays through said medium, whereby to effect a deviation of the interference lines by and in accordance with the surface roughness of said matrix.

2. A method of determining surface roughness comprising producing a transparent matrix film having a surface being an exact replica of the surface to be investigated, impinging monochromatic light upon a wedge-shaped light transmitting medium bounded by plane reflecting surfaces and having a refractive index differing from the refractive index of said film, to produce a multiple line interference pattern by light rays reflected by said surfaces, and positioning said film in the path of the light rays through said medium, whereby to effect a deviation of the interference lines by and in accordance with the surface roughness of said matrix.

3. A method of determining surface roughness comprising producing a transparent matrix film having one side being an exact replica of the surface to be investigated and having a substantially smooth surface on its opposite side, impinging monochromatic light upon a fluid wedge-shaped light transmitting medium bounded by plane reflecting surfaces and having a refractive index differing from the refractive index of said film, to produce a multiple-line interference pattern by light rays reflected by said surfaces, and positioning said matrix film in the path of the light rays passing through said medium, whereby to effect a deviation of the interference lines by and in accordance with the surface roughness of said film.

4. A method of determining surface roughness according to the interference method comprising superimposing a pair of light beams derived from a source of monochromatic light to produce a predetermined interference line pattern, producing a transparent matrix of the surface to be investigated, and positioning said matrix in the path of one of said light beams, said matrix having a refractive index different from the refractive index of the medium traversed by said last-mentioned light beam, whereby to vary the optical path difference of said light beams to effect a deviation of the interference lines by and in accordance with the surface roughness of said matrix.

5. In the art of determining surface roughness according to the interference method whereby multiple interference lines are produced from a pair of interfering light beams by impinging monochromatic light upon a wedge-shaped space bounded by substantially plane reflecting surfaces, the method comprising producing a transparent matrix having a surface being an exact replica of the surface to be investigated, positioning said matrix within said space together with a light transmitting medium having a refractive index different from the refractive index of said matrix and filling the spaces intervening between said matrix and said reflecting surfaces, thereby to vary the optical path difference between the said light beams and to cause corresponding deviations of the interference lines by and in accordance with the surface roughness of said matrix.

6. In the art of determining surface roughness according to the interference method whereby multiple interference lines are produced from a pair of interfering light beams by impinging monochromatic light upon a wedge-shaped space bounded by substantially plane reflecting surfaces, the method comprising producing a transparent matrix film having one face being an exact replica of the surface to be investigated and having a substantially smooth face on the opposite side thereof, positioning said film within said space together with a liquid light transmitting medium having a refractive index different from the refractive index of said film and filling the spaces intervening between said film and said reflecting surfaces, thereby to vary the optical path difference between said light beams to cause corresponding deviations of the interference lines by and in accordance with the surface roughness of said film.

7. In the art of determining surface roughness according to the interference method whereby multiple interference lines are produced from a pair of interfering light beams by impinging monochromatic light upon a wedge-shaped space bounded by substantially plane reflecting surfaces comprising producing a transparent matrix film having one face being an exact replica of the surface to be investigated and having a substantially smooth face on the opposite side thereof, positioning said film within said space together with a first medium filling the intervening space between one face of said film and the adjacent reflecting surface and a second medium filling the intervening space between the opposite face of said film and the other reflecting surface, at least one of said media having a refractive index different from the refractive index of said film, thereby to vary the optical path difference between said light beams to cause corresponding deviations of the interference lines by and in accordance with the surface roughness of said film.

References Cited in the file of this patent

UNITED STATES PATENTS

| Number | Name | Date |
|---|---|---|
| 2,412,602 | Chambers | Dec. 17, 1946 |
| 2,518,647 | Teeple et al. | Aug. 15, 1950 |
| 2,641,958 | Zobel et al. | June 16, 1953 |